United States Patent [19]

Fellows et al.

[11] Patent Number: 5,098,680

[45] Date of Patent: Mar. 24, 1992

[54] AQUEOUS AMMONIA INJECTION SCHEME

[75] Inventors: William D. Fellows, Randolph; Donald E. Krider, Convent Station, both of N.J.

[73] Assignee: Exxon Research & Engineering Company, Florham Park, N.J.

[21] Appl. No.: 597,265

[22] Filed: Oct. 15, 1990

[51] Int. Cl.$^5$ .............................. C01B 21/00; B01J 8/00
[52] U.S. Cl. ...................................... 423/235; 423/239
[58] Field of Search .................. 423/235, 235 D, 239, 423/239 A

[56] References Cited

U.S. PATENT DOCUMENTS 4,235,851 11/1980 Flockenhaus ..................... 423/235
4,500,501 2/1985 Hamada et al. ................... 423/235

Primary Examiner—Gregory A. Heller
Attorney, Agent, or Firm—Roy J. Ott

[57] ABSTRACT

An improved process for reducing nitrogen oxide emissions to the atmosphere comprises the injection of ammonia vapor, formed by the vaporization of an aqueous ammonia solution, into a combustion effluent. A dilute aqueous ammonia phase, produced by such vaporization, may also be injected, either in vapor or liquid form, into a combustion effluent. Temperature and pressure control of such vaporization may be used to maintain the desired concentration of ammonia injected into the combustion effluent.

10 Claims, 3 Drawing Sheets

AQUEOUS AMMONIA INJECTION SCHEME

FIELD OF THE INVENTION

The present invention relates to a non-catalytic method for reducing the concentration of nitrogen oxides in a combustion effluent. More particularly, the invention is directed to a process in which an ammonia rich vapor is injected into such a combustion effluent to convert the nitrogen oxides contained therein to less deleterious compounds, the process improvement comprising the production of the ammonia rich vapor from an aqueous ammonia solution.

BACKGROUND OF THE INVENTION

Combustion effluents and waste products from various installations are a major source of air pollution when discharged into the atmosphere. One particularly troublesome pollutant found in many combustion effluent streams is $NO_2$, a major irritant. Furthermore, it is believed that $NO_2$ undergoes a series of reactions known as photo-chemical smog formation, in the presence of sunlight and hydrocarbons. The major source of $NO_2$ is $NO_x$ which to a large degree is generated at such stationary installations as gas and oil-fired steam boilers for electric power plants, process heaters, incinerators, coal fired utility boilers, glass furnaces, cement kilns, and oil field steam generators.

Various methods have been developed for reducing the concentration of nitrogen oxides in combustion effluents. One such method is the non-catalytic method disclosed in U.S. Pat. No. 3,900,554 to Lyon, which patent is incorporated herein by reference. The process disclosed in that patent teaches the reduction of $NO_x$ to $N_2$ by injecting ammonia into the combustion effluent stream at an elevated temperature. In general, the following two equations describe the reactions which govern the overall process:

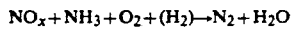

As indicated by the first equation, hydrogen ($H_2$) can be injected along with $NH_3$ to extend the effectiveness of the first reaction, for example, at lower temperatures. Of course, it is desirable to minimize the formation of $NO_x$ according to the second equation.

U.S. Pat. No. 3,900,554 teaches the use of ammonia either as a pure substance or in a precursor form. Useful precursor forms of ammonia include the compounds ammonium carbonate, ammonium formate, and ammonium oxalate. All the these substances yield ammonia on vaporization, while the formate and oxalate precursors also yield formic acid and oxalic acid respectively. Vaporization of the ammonia or its precursor may be accomplished as a separate step or by its injection into the hot effluent being treated. If vaporization of ammonium formate or ammonium oxalate, or their solutions in water, is accomplished as a separate step, then one may, if desired, decompose the formic, the oxalate acid, or both, by either thermal or catalytic means prior to injection into the hot effluent.

Since the issuance of U.S. Pat. No. 3,900,554, there has been a proliferation of patents and publications relating to the injection of ammonia into combustion effluent streams for reducing the concentration of $NO_x$ (nitrogen oxides). The present invention builds on and is a further improvement to the teachings of Pat. Nos. 3,900,554, 4,115,515, 4,423,017, 4,507,269, 4,624,840 and 4,636,370. Although it has generally been disclosed that ammonia or its precursor may be stored and/or used in a solution of water, the process as defined by the above-mentioned patents has been commonly practiced via the injection of vaporized anhydrous ammonia. However, there are some perceived problems with using anhydrous ammonia for this process. Although anhydrous ammonia is a commonly used commodity, there has been growing environmental and safety concerns regarding the storage of large amounts of ammonia at plant sites. The use of aqueous ammonia alleviates these concerns, since it can be stored at atmospheric pressure and, should there be a spill, the ammonia release will be slowed to the extent that it will not represent nearly as significant a threat to human health as would the release of anhydrous ammonia.

Although posing less of an environmental risk, the use of a liquid aqueous form of ammonia has been problematic because conventional injection in such form requires excess ammonia, in order to overcome the inherent maldistribution of ammonia resulting from the rapid vaporization of the ammonia solution upon injection. As a result, either additional chemicals are needed to reduce ammonia slip and/or additional ammonia removal equipment, in the flue gas cleanup system, are needed to reduce the excess ammonia to acceptable levels.

This invention overcomes, or substantially decreases, the limitations of conventional or existing practices. This is accomplished by the use of an aqueous solution of ammonia to produce an ammonia-containing vapor for injection into a combustion effluent. The use of a vapor greatly improves mixing, thereby reducing to a minimum the the amount of excess ammonia.

Vaporization of an aqueous solution of ammonia to produce an ammonia containing vapor, however, results in a blow-down stream that, although low in ammonia concentration, may contain too much ammonia to be directly disposed of in an environmentally acceptable manner without further treatment. A further aspect of this invention involves the disposal of this blow-down stream in an environmentally acceptable manner.

SUMMARY OF THE INVENTION

In accordance with the present invention, there is provided an improved process for non-catalytically reducing the concentration of nitrogen oxides contained in a combustion effluent. This process involves injecting ammonia into the combustion effluent, which ammonia is in the form of an ammonia rich vapor stream obtained by the partial vaporization of an aqueous ammonia solution. This partial vaporization also yields a dilute aqueous ammonia blow-down stream which, either vaporized or unvaporized, may be utilized elsewhere in the plant or also injected into a combustion effluent.

In one preferred embodiment of the present invention, the operating conditions within the means for partial vaporization are controlled to maintain the desired ammonia concentration of the liquid and gaseous phases contained therein.

BRIEF DESCRIPTION OF THE FIGURES

The invention will be more clearly understood upon reference to the detailed discussion below in conjunction with the drawings wherein.

DETAILED DESCRIPTION OF THE INVENTION

Figure 1:
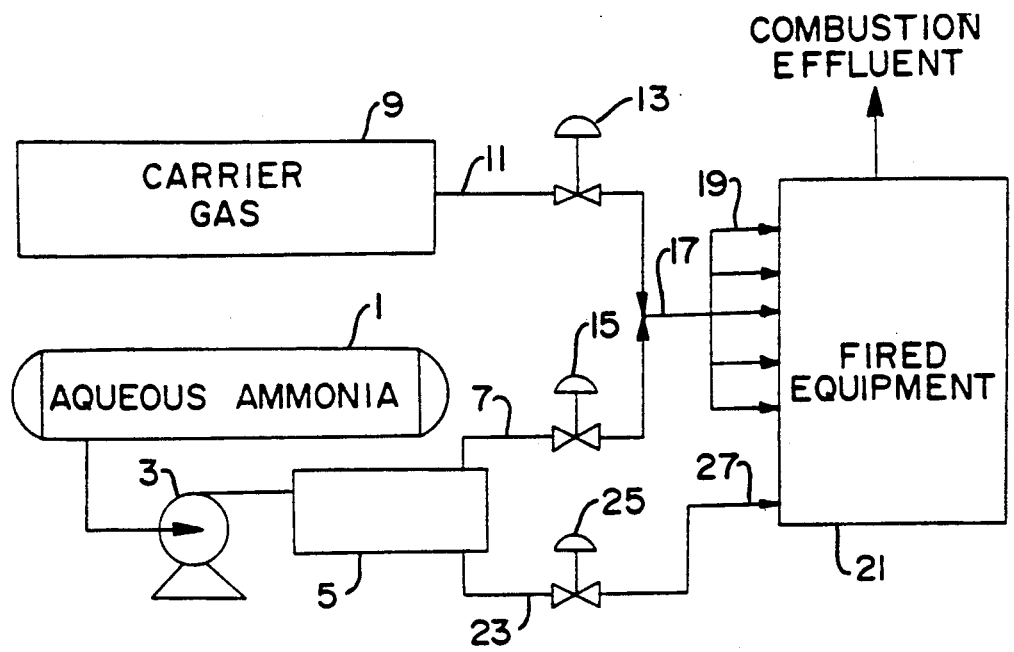
FIG. 1 is a schematic diagram of one embodiment of the present invention in which an ammonia-containing vapor and an ammonia-containing aqueous solution are used to treat a combustion effluent.

As previously indicated, the present invention relates to an improved non-catalytic process for reducing nitrogen oxide or $NO_x$ emissions to the atmosphere from a combustion source such as gas and oil-fired steamed boilers for electric power plants, process furnaces, municipal incinerators, coal-fired utility boilers, and the like.

As is well-known, combustion is commonly effected in combustion equipment such as boilers, furnaces and incinerators, in a section of the equipment commonly referred to as a firebox. Generally, combustion is accomplished by igniting, with one or more burners, a suitable fuel in the presence of air. The principal combustion products are carbon dioxide and steam. Other combustion products are carbon monoxide and the various oxides of nitrogen and sulfur, combined with any excess oxygen and unconverted nitrogen. Together, these combustion products form what is referred to herein as a combustion effluent.

The process of the invention involves the use of ammonia in the form of an aqueous solution. This aqueous solution is partially vaporized to yield an ammonia rich vapor stream, which vapor stream is then mixed with a carrier gas for ultimate injection into a combustion effluent for the purpose of reducing $NO_x$ emissions. The partial vaporization of an aqueous ammonia solution will also yield a dilute aqueous ammonia stream which may also be injected, either vaporized or unvaporized, into the same or another combustion effluent. Alternatively, if the dilute aqueous ammonia stream is made sufficiently dilute, for example by a stripper, then such stream may be usable, for example in a scrubber, in another part of the plant.

As is conventional practice, the present invention involves injecting ammonia into a combustion effluent within a certain temperature range, for a sufficient residence time, so that the $NO_x$ reduction reaction is most fruitful. The optimum quantity of ammonia to achieve the maximum $NO_x$ reduction while minimizing ammonia slip is a function of many variables, with temperature and residence time being the primary ones. It is preferable to determine the optimum quantity and location of the ammonia injection, and to inject an ammonia-containing vapor with a carrier gas through nozzles with sufficient velocity to achieve intimate mixing of the ammonia with the combustion effluent.

Generally, any suitable means may be used to facilitate injection of ammonia into the combustion effluent. In the simplest embodiment, a suitably insulated or cooled tube, having a nozzle portion, can be disposed such that the ammonia upon injection substantially blankets the entire cross-section of combustion effluent gas flow area.

Generally, the volume of combustion effluent at the conditions at which the reducing gas is injected will be quite large when compared to the amount of ammonia required to effect the desired $NO_x$ reduction and, indeed, could be 10,000 times as great or even greater. Therefore, in order to effect the desired mixing and contacting of this volume of ammonia, the ammonia will generally be combined with a diluent. In general, any innocuous gaseous material could be used as a diluent, including steam, nitrogen, helium, and the like. The preferred carrier is compressed air.

The temperature of the combustion effluent is typically at a maximum at or near the point of combustion and decreases axially (along the flow path) and radially (outwardly) as the effluent moves along its flow path from the point of combustion until it is ultimately emitted to the atmosphere or otherwise loses its identify as a combustion effluent. Moreover, the temperature in any given combustion facility will also vary with operating conditions such as the particular fuel burned, the amount of such fuel burned, the number of burners used to effect the burning, and the rate of cooling effected by the energy recovery method used.

Effective $NO_x$ reduction can be achieved over a relatively broad temperature range by varying the reducing gas composition. However, as a result of the above mentioned variations in temperature, as well as variations in flow rate across the effluent flow path, it is not generally possible to achieve a maximum reduction in $NO_x$ emissions to the atmosphere at all possible modes of operation for a given combustion facility when using a single reducing gas injection means at a fixed location. This deficiency may be avoided to some extent by providing a plurality of different compositions for injection into the effluent stream within different temperature and or flow rate ranges. In addition, a plurality of injection means may be provided along the combustion effluent flow path.

The reaction of ammonia with the nitrogen oxides in the combustion effluent may be carried out at pressures from about 0.1 atmospheres to 100 atmospheres. The velocities of the combustion effluent, as well as the mixing of the ammonia in the post-combustion zone, are regulated so that there is an effective residence time, in a temperature range of 1300° K. to 1600° K., to enable the ammonia to remove $NO_x$ from the combustion effluent stream. The residence time will suitably range from about 0.001 to 10 seconds.

In the practice of the present invention, ammonia is contacted with the combustion effluent in the presence of oxygen. The combustion effluent usually contains a suitable amount of oxygen. However, if the oxygen content is too low, air may be used to dilute the combustion effluent to give an oxygen content greater than about 0.1 volume %, preferably about 1 to 15 volume %, based on the total volume of effluent.

The amount of ammonia suitable for the practice of the present invention is usually from about 0.4 to 50 times the $NO_x$ concentration in the combustion effluent. The minimum amount of ammonia is usually at least one mol of ammonia per mol of $NO_x$ to be removed, although the specific amount of ammonia employed can be selected from the viewpoint of economical operation and $NO_x$ removal rate. In order to achieve a high conversion of $NO_x$, it is desirable to employ ammonia in an amount greater than one mol of ammonia per mol of $NO_x$ to be removed. However, such greater amounts of ammonia may cause ammonia to remain unreacted in the combustion effluent, even beyond the temperature zone where $NO_x$ is reduced. Unreacted ammonia which is emitted to the atmosphere in the combustion effluent is referred to herein as ammonia breakthrough. Because ammonia breakthrough must often be minimized, a constraint may be placed on commercial applications because both the range of concentration of ammonia to $NO_x$ in the combustion effluent and the range of acceptable residence times may have to be decreased. Certain government regulations concerning an acceptable level of $NO_x$ reduction may be pertinent.

Referring to FIG. 1, we see one embodiment according to the present invention. An aqueous solution of ammonia, the source for ammonia to be used for treating a combustion effluent, is stored in a tank 1, preferably near atmospheric pressure. In operation, a pump 3 transports the ammonia to a means for vaporizing the ammonia, which means is referred to as ammonia vaporizer 5. This vaporizes produces two streams, a first ammonia rich vapor stream in line 7 and a dilute aqueous ammonia stream in line 23. The ammonia vaporizer 5 may be any conventional means that performs the required separation. As will be appreciated by those skilled in the art, this may be either a vaporizer drum or a stripping tower. A vaporizer drum is typically provided with indirect heat by means of steam to accomplish the desired vaporization. A stripping tower accomplishes vaporization by means of vacuum and/or heat and/or a stripping gas. Preferred stripping gases include steam and air. Steam may be directly introduced into the stripping tower.

The ammonia rich vapor stream in line 7 is mixed with a carrier gas in line 11, from a carrier gas supply means 9. Typically the carrier gas is steam or compressed air. Valves 13 and 15 are used for flow control and the proportioning of ammonia and carrier gas, it being understood by those skilled in the art that conventional process control equipment may be employed to automate the system. The combined gaseous mixture, in line 17, comprising ammonia vapor and carrier gas, is injected via a plurality of nozzles, generally designated 19 in the figure, into fired equipment 21, through which a combustion effluent flows. The dilute aqueous ammonia stream in line 23, which stream passes through a valve 25, is suitably injected into the combustion effluent by means of one or more spray nozzles 27.

Alternately, the dilute aqueous ammonia stream 23 may be combined with carrier gas, e.g., steam or compressed air, in stream 11, preferably before the carrier gas is combined with the ammonia rich vapor stream. Since the carrier gas is at an elevated temperature, in the case of compressed air caused by the heat of compression, typically 350 to 400° F., the dilute aqueous stream may be readily vaporized by injecting it into the carrier gas stream. A conventional nozzle may be employed to introduce the dilute aqueous stream into the conduit transporting the carrier gas, which nozzle may be disposed concurrently to the flow of carrier gas. Of course, it is within the scope of the invention to utilize additional heating or other means to accomplish the vaporization of the dilute aqueous ammonia stream into a carrier gas stream.

The operating conditions in the ammonia vaporizer 5 may be controlled to provide the proper concentrations and quantities in the two streams; these concentrations and quantities are determined, by an evaluation of $NO_x$ reduction via ammonia injection using generally acceptable models, such that the total ammonia injected, vapor and liquid, equals the product of the inlet $NO_x$ concentration and the required ammonia to $NO_x$ molar ratio to achieve the required $NO_x$ reduction. However, the ammonia injected in liquid form is limited such that it, together with unreacted ammonia from vapor injection, does not exceed the allowable ammonia slip from the reaction.

Figure 2:
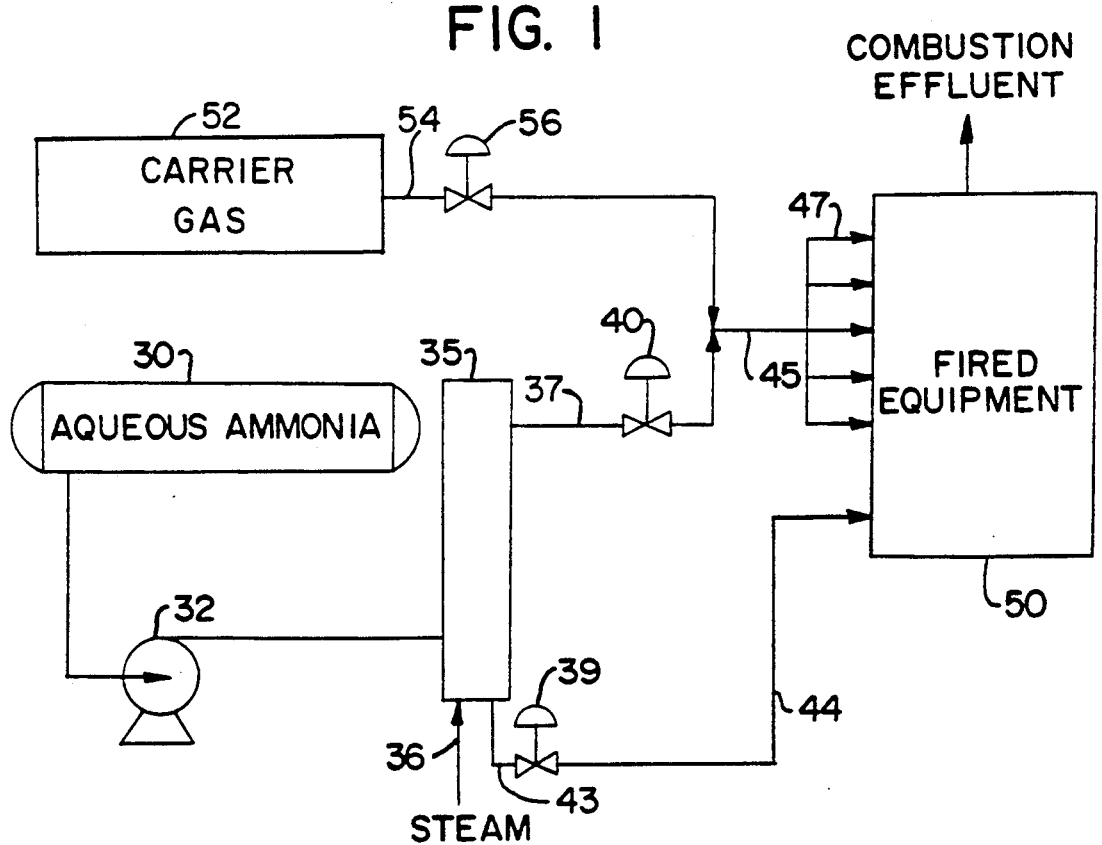
FIG. 2 is a schematic diagram of a second embodiment of the present invention in which an ammonia-containing vapor produced by a stripper is used to treat a combustion effluent.

An alternate embodiment of the process according to the present invention is shown in FIG. 2. An aqueous solution of ammonia, stored in a tank 30, at or near atmospheric pressure, is transported by pump 32 to an ammonia vaporizer, in this case a stripping tower 35. This tower 35 produces two streams, a first ammonia rich vapor stream in line 37 and a dilute aqueous ammonia stream in line 43. The tower 35, in this example, accomplishes vaporization by means of steam in line 36, which steam is introduced directly into the bottom portion of the tower 35.

The dilute aqueous ammonia stream in line 43, withdrawn from the bottom portion of the tower 35, after passing through a valve 39, is typically sent to fired equipment 50 via line 44. Alternatively, since the aqueous ammonia stream is dilute, it may be used in another part of the plant, for example, in a scrubber, after passing through a valve 39.

The above-mentioned ammonia rich vapor stream 37, withdrawn from the top portion of the tower 35, is mixed with the carrier gas from carrier gas supply means 52 in line 54 after valve 56. The combined gaseous mixture, in line 45, comprising the ammonia vapor and carrier gas, is injected via a plurality of nozzles, generally designated 47 in FIG. 2, into fired equipment 50, through which a combustion effluent flows.

The operating conditions in the stripping tower 35 are controlled to provide the proper concentrations and quantities in the two streams; these concentrations and quantities are determined, by an evaluation of $NO_x$ reduction via ammonia injection using generally acceptable models, such that the total ammonia injected equals the product of the inlet $NO_x$ concentration and the required ammonia to $NO_x$ molar ratio to achieve the required $NO_x$ reduction.

Figure 3:
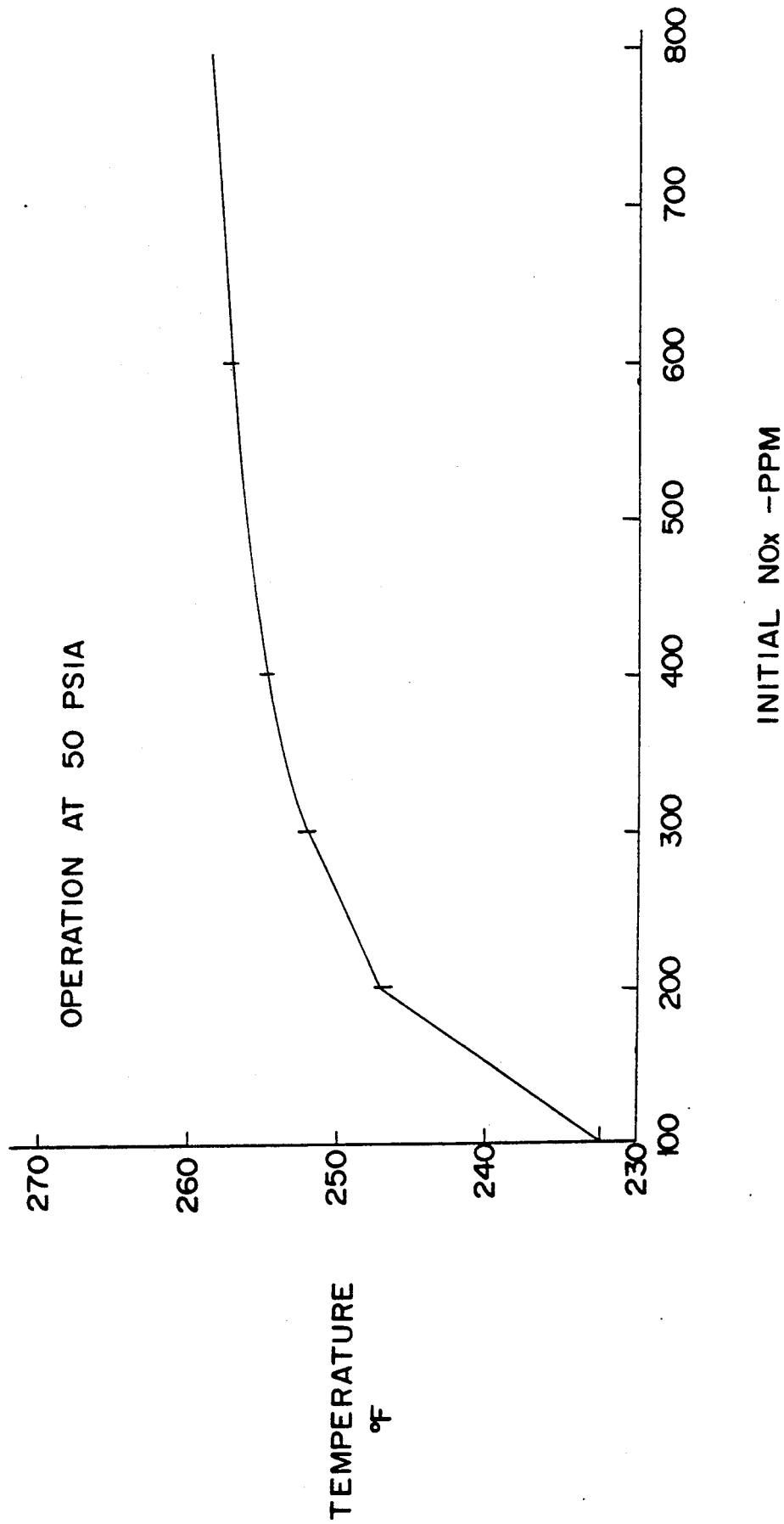
FIG. 3 is a graph illustrating vaporizer operating conditions for a process according to the present invention, wherein the ammonia to $NO_x$ ratio is 1.5 and the ammonia supply is a 25% aqueous solution, which graph shows how the vaporizer temperature would have to be varied for various untreated $NO_x$ concentrations, in order to maintain a constant 30 vppm ammonia slip in the effluent.

FIG. 3 illustrates vaporizer operating conditions, at an ammonia to $NO_x$ ratio of 1.5 and where the ammonia supply is a 25% aqueous solution. This curve shows how the vaporizer temperature would have to be varied to maintain a constant 30 vppm ammonia slip in the effluent, with various initial or untreated $NO_x$ concentrations.

Figure 4:
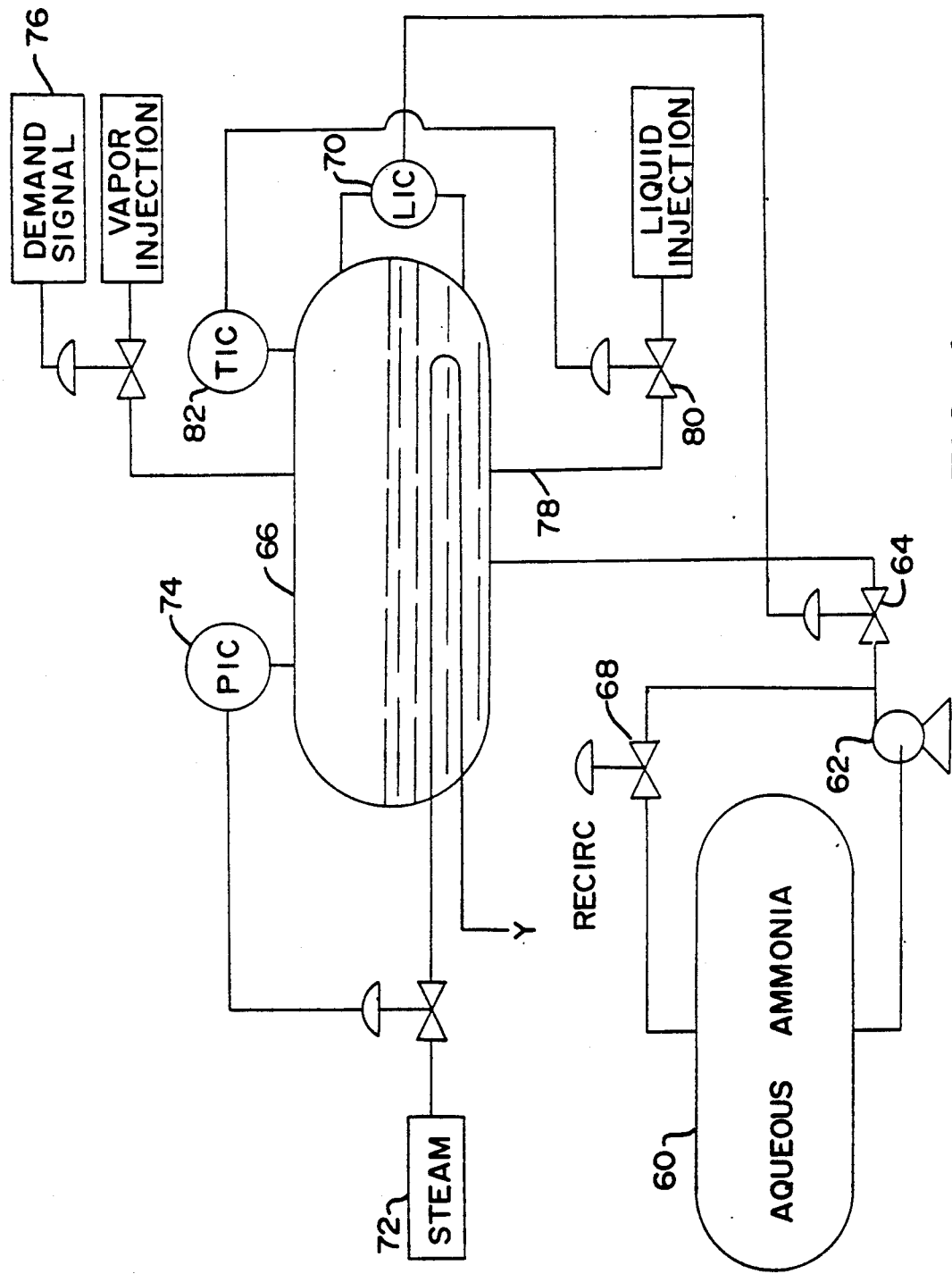
FIG. 4 is a schematic diagram showing one embodiment of a control scheme for practicing the process according to the present invention.

FIG. 4 shows a possible control scheme for practicing the invention. Aqueous ammonia in tank 60 is transported via a pump 62, through a flow control valve 64, to a vaporizer drum 66. An automatic recirculation valve 68 is employed to protect the pump 62. This flow control valve 68 is open or closed by the level controller 70 as required to maintain the desired liquid level in the vaporizer drum 66. A heating source 72, steam in this example, is controlled by a pressure sensing control system 74, which senses the pressure in the vaporizer drum 66. Constant pressure in the vaporizer drum is desirable to insure that accurate flow control of the ammonia injection rate is achieved. The flow rate of ammonia-containing vapor is controlled in response to a demand signal 76 from a $NO_x$ control system (not shown) for controlling the injection of the ammonia-containing vapor.

The flow rate of blow-down stream 78, which is withdrawn from the vaporizer drum 66 through adjustable valve 80, is controlled by a temperature sensing controller 82 that senses the temperature in the vaporizer drum 66.

Flow control, by the temperature sensing controller 82, of the blow-down stream 78 serves to maintain the desired ammonia concentration in the liquid phase of the vaporizer drum 66, since this is a function of temperature and pressure, and the pressure is controlled independently. The system will be self-correcting since, if the concentration is too high, the temperature will drop, causing the valve to close until the desired temperature and concentration are reached. On the other hand, if the temperature is too high, then the concentration in the liquid is lower than desired. The valve will open wider, increasing the blow-down flow and the feed rate of strong liquid until the desired concentration is reached.

EXAMPLE

In a process according to the present invention, a combustion effluent containing $NO_x$ is treated with ammonia to reduce the $NO_x$ to nitrogen. This example assumes 300 vppm initial $NO_x$ in the combustion effluent. An aqueous ammonia stream comprising 67 lbs/hr of ammonia and 201 lbs/hr of water are introduced into a vaporizer drum. Vaporization of the aqueous ammonia in the vaporizer drum is accomplished with steam, which provides 45 KW of heat. The operating conditions in the vaporizer drum are 250° F. and 50 psia. Two streams are withdrawn from the vaporizer drum: a first ammonia rich vapor stream comprising 61 lbs/hr of ammonia and 86 lbs/hr of water; and a second blow-down liquid stream comprising 6 lbs/hr of ammonia and 115 lbs/hr of water. The first stream is utilized for vapor injection at a first location into a combustion effluent and the second stream is utilized for liquid injection at a second location into the same combustion effluent. The combustion effluent so treated is calculated to have a $NO_x$ content of 120 ppm, representing a 60 percent reduction thereof.

Those skilled in the art will readily appreciate that the injectors of the present invention will have application to various types of combustion systems. While the invention has been described in connection with specific embodiments, it will be further understood that this invention is capable of further modification, and that this application is intended to cover any variations, uses or adaptations of the invention and including such departures from the present disclosure as come within known or customary practice in the art, and as fall within the scope of the invention.

What is claimed is:

1. A process for reducing the concentration of nitrogen oxides contained in combustion effluents, comprising
   (a) partially vaporizing an aqueous ammonia-containing solution in a separation zone to produce at least two streams; a first stream comprising ammonia rich vapor and a second stream comprising dilute aqueous ammonia;
   (b) mixing said first stream comprising ammonia rich vapor with a carrier gas;
   (c) injecting the mixture of ammonia rich vapor and carrier gas into a combustion effluent produced by a combustion zone; and
   (d) disposing of said second stream comprising dilute aqueous ammonia by either (i) injecting the second stream into the combustion effluent or (ii) utilizing the second stream in a scrubber or other plant unit.

2. The process of claim 1, wherein said dilute aqueous ammonia is injected into a combustion effluent at a different location from where the ammonia rich vapor is injected.

3. The process of claim 1, wherein said dilute aqueous ammonia is injected into and vaporized into a carrier gas and thereafter injected into the combustion effluent.

4. The process of claim 3, wherein the carrier gas is compressed air at an elevated temperature in the range of 400 to 500° F.

5. A process for reducing the concentration of nitrogen oxides contained in combustion effluents, comprising
   (a) partially vaporizing an aqueous ammonia-containing solution in a separation in a separation zone to produce at least two streams; a first stream comprising ammonia rich vapor and a second stream comprising dilute aqueous ammonia;
   (b) disposing of said second stream comprising dilute aqueous ammonia, by injecting said second stream into a carrier gas where it is vaporized to produce a dilute ammonia vapor stream;
   (c) combining said dilute ammonia vapor stream with said first stream, comprising ammonia rich vapor, to produce a combined ammonia vapor stream; and
   (d) injecting said combined ammonia vapor stream into a combustion effluent produced by a combustion zone.

6. The process of claim 5, wherein the carrier gas is compressed air at an elevated temperature in the range of 400 to 500° F.

7. The process of claim 5 wherein a heating source for supplying heat to the separation zone is controlled by a pressure sensing controller, which senses the pressure int eh separation zone, such that a constant pressure is maintained in the separation zone to insure that the desired flow rate of the ammonia rich vapor out of the separation zone is accurately achieved.

8. The process of claim 7, wherein the flow rate of ammonia rich vapor is controlled in response to a demand signal and wherein the flow rate of said dilute aqueous ammonia stream is controlled by a temperature sensing controller such that the desired ammonia concentration int he liquid phase of the separation zone is maintained as a function of temperature and pressure.

9. A process for reducing the concentration of nitrogen oxides contained in a combustion effluent produced in a combustion zone, which process comprises:
   (a) partially vaporizing an aqueous ammonia-containing solution in a vaporizing zone to yield at least two streams: a first stream comprising ammonia rich vapor and a second or blow-down stream comprising dilute aqueous ammonia;
   (b) injecting the ammonia rich vapor into a combustion effluent at a first location in or about a combustion zone;
   (c) injecting the dilute aqueous ammonia, either vaporized or unvaporized, into the same combustion effluent;
   wherein the operating conditions in the vaporizing zone are controlled to provide the proper concentrations and quantities of ammonia in said first and second streams, according to which a heating source for the vaporizing zone is controlled by a pressure sensing controller, which senses the pressure in the vaporizing zone, such that a constant pressure in said vaporizing zone is maintained to insure that the desired flow rate and injection rate of said ammonia rich vapor injection is achieved, and wherein the flow rate of the ammonia rich vapor is controlled in response to a demand signal, and wherein the flow rate of said second or blowdown stream is controlled by a temperature sensing controller, which senses the temperature in said vaporizing zone, such that the desired ammonia concentration in the liquid phase of the vaporizer is maintained as a function of temperature and pressure.

10. The process of claim 9 wherein the ammonia rich vapor is mixed with a carrier gas prior to injection into the combustion zone.

* * * * *